(12) United States Patent
Okura (10) Patent No.: US 11,594,751 B2
(45) Date of Patent: Feb. 28, 2023

(54) BATTERY

(71) Applicant: Toyota Jidosha Kabushiki Kaisha, Toyota (JP)

(72) Inventor: Toshinori Okura, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 750 days.

(21) Appl. No.: 16/707,242

(22) Filed: Dec. 9, 2019

(65) Prior Publication Data

US 2020/0185762 A1  Jun. 11, 2020

(30) Foreign Application Priority Data

Dec. 10, 2018 (JP) .............................. JP2018-230972

(51) Int. Cl.
*H01M 10/0525* (2010.01)
*H01M 4/66* (2006.01)
*H01M 4/02* (2006.01)

(52) U.S. Cl.
CPC ....... *H01M 10/0525* (2013.01); *H01M 4/662* (2013.01); *H01M 2004/027* (2013.01); *H01M 2004/028* (2013.01)

(58) Field of Classification Search
CPC ............. H01M 10/0525; H01M 4/662; H01M 2004/027; H01M 2004/028; H01M 50/176; H01M 50/55; H01M 50/553; H01M 50/562; H01M 10/0587; H01M 4/667; Y02E 60/10

USPC ........................................................ 429/209
See application file for complete search history.

(56) References Cited

U.S. PATENT DOCUMENTS

| 2010/0203371 | A1  | 8/2010  | Nagai et al. |
| 2018/0272456 | A1* | 9/2018  | Kobayashi ........... B23K 11/002 |
| 2018/0315982 | A1  | 11/2018 | Daidoji et al. |

FOREIGN PATENT DOCUMENTS

| JP | 2009-026705 A | 2/2009 |
| JP | 2013-161686 A | 8/2013 |
| JP | 2018-163856 A | 10/2018 |
| WO | 2017090391 A1 | 6/2017 |

* cited by examiner

*Primary Examiner* — Gary D Harris
(74) *Attorney, Agent, or Firm* — Dinsmore & Shohl LLP (57) ABSTRACT

Provided is technology which can prevent breakage of a collector in a battery using an electrode sheet including an uncoated part with a narrowed width. A battery includes a collector bundle including an uncoated part stacked in a plurality of layers formed at each side edge in the width direction of the electrode body. A junction part including compressed uncoated part in plural layers is formed at an outer end in the width direction of the collector bundle. A converging part including the collector in plural layers converging so that the surface is inclined toward the junction part is formed inside in the width direction. The foil collecting angle of the collector bundle is 120° or more and 160° or less, and an R part with a curvature radius of 0.3 mm or more is formed at the converging part side end of the junction surface of the collector terminal.

4 Claims, 4 Drawing Sheets

BATTERY

CROSS REFERENCE TO RELATED APPLICATION

The present application claims the benefit of priority to Japanese Patent Application No. 2018-230972 filed on Dec. 10, 2018, the content of which is incorporated herein by reference in their entirety.

BACKGROUND

1. Technical Field

The present disclosure relates to a battery including an electrode body, and a collector terminal to be joined to the electrode body.

2. Description of the Related Art

In recent years, a lithium ion secondary battery, a nickel hydrogen battery, and other secondary batteries have grown in importance as the power supply to be mounted in a vehicle, or the power supplies of a personal computer and a portable terminal. Particularly, a lithium ion secondary battery is lightweight and can provide a high energy density, and hence has been used as a high-output power supply to be mounted in a vehicle.

As one example of the electrode body of this kind of battery, a wound electrode body including wound electrode sheets of a positive electrode and a negative electrode may be mentioned. The electrode sheet of the wound electrode body includes a foil-shaped collector, and an active material layer coated on the surface of a collector. Then, at one side edge in the width direction of the electrode sheet, an uncoated part at which an active material layer is not formed and the collector is exposed is formed. In the wound electrode body including such wound electrode sheets wound therein, a collector bundle including the uncoated part (exposed collector) wound and stacked in a plurality of layers is formed at each opposite side edge in the width direction.

Figure 4:
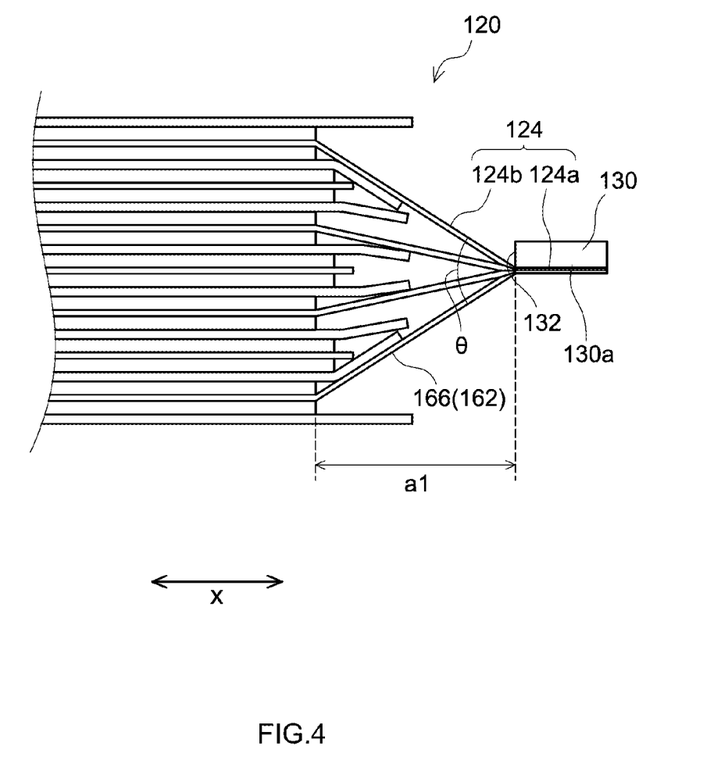
FIG. 4 is a cross sectional view schematically showing a junction structure between a collector bundle and an electrode terminal in a conventional battery.

As shown in FIG. 4, a collector terminal 130 is joined to a collector bundle 124 of the wound electrode body 120 described above. Specifically, at the outer end in the width direction X of the collector bundle 124, a flat region (junction part 124*a*) including the collector 162 (uncoated part 166) in a plurality of layers, compressed together, is formed. A junction surface 130*a* of the collector terminal 130 is joined to the junction part 124*a*. Further, a converging part 124*b* including the uncoated part 166 in a plurality of layers converging so that the surface is inclined toward the junction part 124*a* is formed at the collector bundle 124. Hereinafter, the angle formed by the inclined surfaces of the converging part 124*b* will be referred to as "foil collecting angle θ".

When the collector terminal 130 is joined to the collector bundle 124 in the foregoing configuration, the collector 162 forming the collector bundle 124 may be broken. In this case, the conduction resistance in the collector bundle 124 increases, so that the cell life may be shortened due to heat generation during charging and discharging. Various technologies for preventing the breakage of the collector 162 have been conventionally proposed.

For example, Japanese Patent Application Publication No. 2009-26705 discloses a collector terminal (flat terminal) having a flat part including a junction surface to be joined to the collector, and a first curved part curved from the flat part. By thus subjecting the collector terminal to bending, it is possible to improve the rigidity of the collector terminal. For this reason, it is possible to prevent the breakage of the collector by the deformation of the collector terminal due the pressing force during joining. Further, this document discloses the formation of the outer surface of the connection portion (bended portion) between the curved part and the flat part in a smoothly and continuously curved shape.

SUMMARY

In recent years, with an increasing demand for a higher capacity of the battery with the foregoing structure, an attempt has been made to narrow the width of the uncoated part not contributing to charging and discharging, and to widen the coating area of the active material layer. However, according to a study by the present inventors, when the width of the uncoated part of the electrode sheet is narrowed, it becomes difficult to prevent the breakage of the collector even with the technology described in the above publication. The present inventors conducted a close study on the cause for this phenomenon and revealed the following: in the configuration of FIG. 4, when an electrode sheet with a narrow-width uncoated part 166 is used, the width a1 of the converging part 124*b* is narrowed, and the foil collecting angle θ of the collector bundle 124 increases; accordingly, the breakage of the collector 162 due to the interference between the inclined surface of the converging part 124*b* and the end 132 of the collector terminal 130 becomes more likely to occur.

The present disclosure was completed in view of such circumstances. An object of embodiments of the present disclosure is to provide a technology capable of preventing the breakage of the collector in a battery using an electrode sheet with a narrow-width uncoated part.

The battery disclosed herein includes an electrode body and a collector terminal. The electrode body including a plurality of layers in a stacked manner, wherein the plurality of layers includes a positive electrode sheet and a negative electrode sheet, and the positive electrode sheet and the negative electrode sheet each includes a foil-shaped collector and an active material layer coated on a surface of the collector. The collector terminal is to be joined to a collector of the positive electrode sheet or the negative electrode sheet. Each electrode sheet of the positive electrode sheet and the negative electrode sheet includes an uncoated part formed at one side edge in the width direction of the electrode sheet, wherein the uncoated part is a part in which the active material layer is not coated and the collector is exposed. A collector bundle is provided on both edges in the width direction of the electrode body, wherein, in the collector bundle, a plurality of uncoated parts in a plurality of electrode sheets, each thereof being one electrode sheet, are stacked in layers so as to protrude from the other electrode sheet. A junction part is provided at an outer end in the width direction of the collector bundle, wherein, in the junction part, the plurality of uncoated parts in a plurality of electrode sheets, each thereof being the one electrode sheet, are compressed together. A converging part provided on an inner side in the width direction of the collector bundle, wherein the converging part is a part in which the plurality of uncoated parts in a plurality of electrode sheets, each thereof being the one electrode sheet, are converging in a layer so that the surface is inclined toward the junction part. Meanwhile, the collector terminal has a flat junction surface to be joined with the junction part of the collector bundle. The battery disclosed herein has a foil collecting angle θ of the collector bundle calculated by following equation (1) satisfies a relationship of expression (2), and has an R part with a curvature radius of 0.3 mm or more at an end on the converging part side of a junction surface of the collector terminal. In the equation (1), t represents a thickness (mm) at an inner end in the width direction of the collector bundle, and a1 represent the width (mm) of a converging part.

$$\theta = 2\tan^{-1}(0.5t/a1) \quad (1)$$

$$120° \leq \theta \leq 160° \quad (2)$$

For the battery disclosed herein, the electrode sheet which has been the uncoated part with a narrowed width of is used. When such an electrode sheet is used, the width a1 of the converging part is narrowed. For this reason, the foil collecting angle $\theta$ of the collector bundle which has been conventionally about 80° becomes $120° \leq \theta \leq 160°$. In this case, the breakage of the collector due to the interference between the converging part and the collector terminal becomes more likely to occur. In contrast, for the battery disclosed herein, an R part with a curvature radius of 0.3 mm or more is formed at the end on the converging part side of the junction surface of the collector terminal. In view of the cause of the breakage of the collector described above, the present inventors have conducted various experiments and studies on such a shape of the collector terminal as not to interfere with the converging part even when the foil collecting angle $\theta$ of the collector bundle exceeds 120°. As a result, the present inventors have arrived at a collector terminal including an R part with a curvature radius of 0.3 mm or more formed therein. Use of the collector terminal including an R part with such a curvature radius formed therein can prevent the breakage of the collector even when an electrode sheet narrow at the width of the uncoated part is used.

Further, in accordance with one aspect of the battery disclosed herein, the curvature radius of the R part is equal to or smaller than the thickness of the collector terminal.

As a result, processing of forming the R part can be performed with ease. In addition, the strength of the collector terminal after processing can be sufficiently ensured.

Further, in accordance with one aspect of the battery disclosed herein, the collector includes at least one of copper and an alloy mainly including copper.

The copper and the alloy mainly including copper are low-priced materials having good conductivity, and have an advantage of being less likely to be molten by the electric potential during charging and discharging. For this reason, the copper and the alloy mainly including copper are used for the collector on the negative electrode side in some embodiments. However, undesirably, the collector including the copper type material is less likely to be elongated and tends to be broken when applied with an external pressure. In contrast, in accordance with the technology disclosed herein, it is possible to prevent the collector from being applied with a pressure due to the interference between the converging part and the collector terminal. This can prevent the breakage of the collector bundle even when a collector including a copper type material is used.

Still further, in the aspect in which the collector includes a copper type material, the collector terminal includes at least one of copper and an alloy mainly including copper in some embodiments.

When a copper type material is used for both of the collector and the collector terminal, resistance welding is used for joining between the collector and the collector terminal. With the resistance welding, a stronger pressure is applied than with other welding methods. For this reason, the collector becomes more likely to be broken when the converging part and the collector terminal interfere with each other. However, with the technology disclosed herein, it is possible to prevent the interference between the converging part and the collector terminal. This can prevent the breakage of the collector even when a copper type material is used for the collector and the collector terminal.

DETAILED DESCRIPTION

Hereinafter, as one example of a battery in accordance with one embodiment of the present disclosure, a lithium ion secondary battery will be described. The battery disclosed herein is not limited to a lithium ion secondary battery, and various secondary batteries are also acceptable. Namely, the technology disclosed herein is applicable to various batteries each having a structure in which a collector terminal is joined to a collector bundle of an electrode body, and is also applicable to, for example, a nickel hydrogen battery.

Further, in the following accompanying drawings, the members and parts providing the same effect are given the same numerals and signs for description. The dimensional relation (such as length, width, or thickness) in each drawing does not reflect the actual dimensional relation. Further, matters other than matters particularly mentioned in this specification, and required for practicing the present disclosure can be understood as the design matters of those skilled in the art based on the related art in the present field.

1. Lithium ion secondary battery in accordance with the present embodiment

Figure 1:
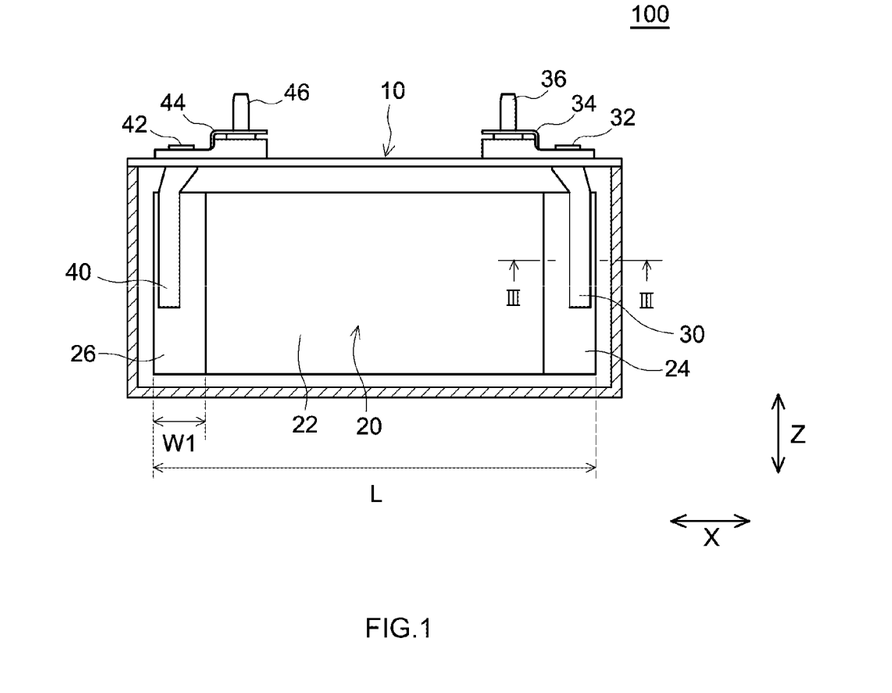
FIG. 1 is a front view schematically showing an internal structure of a lithium ion secondary battery in accordance with one embodiment of the present disclosure.
Figure 2:
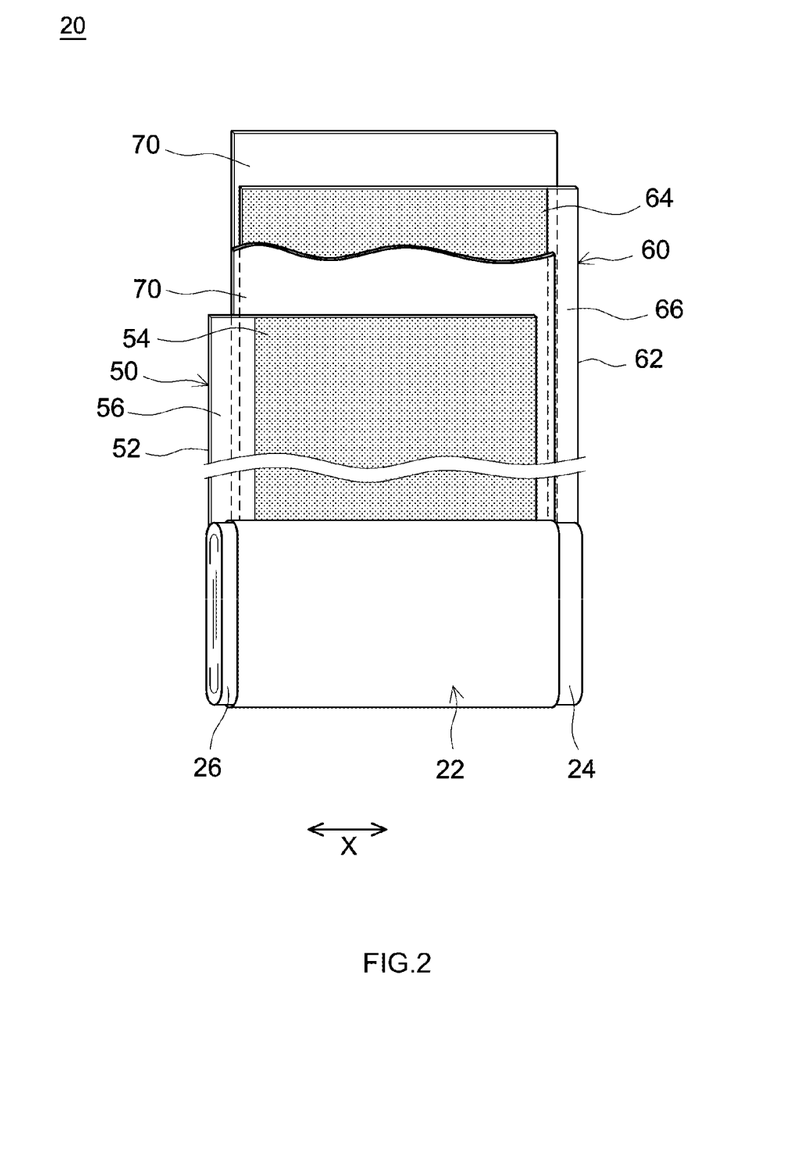
FIG. 2 is a perspective view schematically showing an electrode body in one embodiment of the present disclosure.
Figure 3:
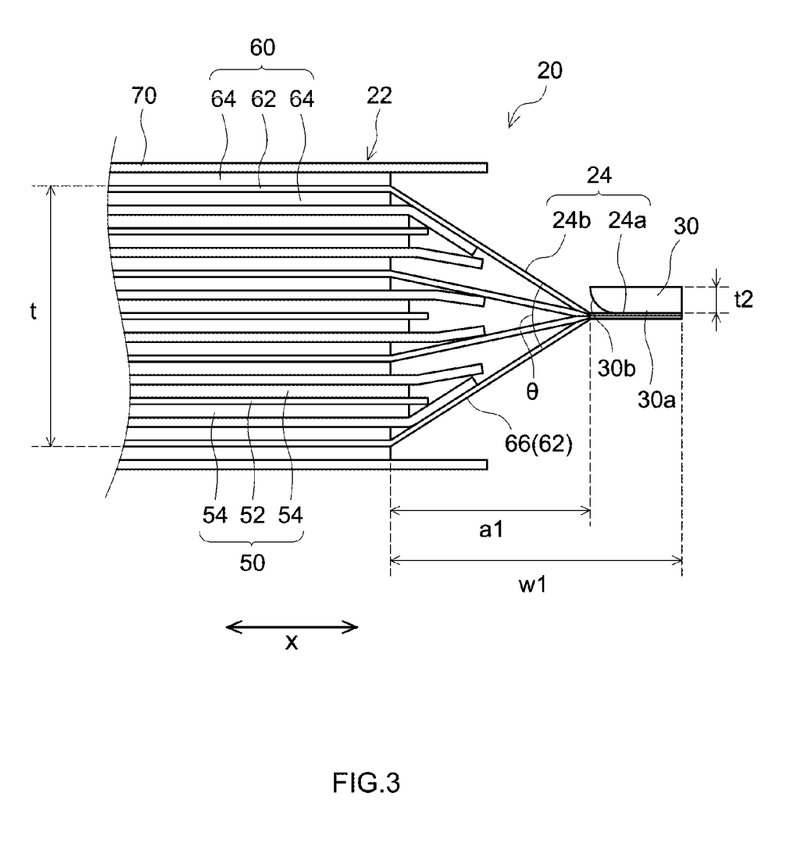
FIG. 3 is a schematic view showing a cross sectional structure along line III-III of the lithium ion secondary battery shown in FIG. 1.

FIG. 1 is a front view schematically showing an internal structure of a lithium ion secondary battery in accordance with the present embodiment. FIG. 2 is a perspective view schematically showing an electrode body in the present embodiment. FIG. 3 is a schematic view showing a cross sectional structure along line III-III of the lithium ion secondary battery shown in FIG. 1. A sign X in each figure in the present specification represents "width direction" and a sign Z represents "height direction".

(1) Overall Configuration

As shown in FIG. 1, a lithium ion secondary battery 100 in accordance with the present embodiment includes an electrode body 20, and an electrolyte (not shown) accommodated in a case 10. Collector bundles 24 and 26 are formed at opposite side edges in the width direction of the electrode body 20. Specifically, the negative electrode collector bundle 24 including an uncoated part (negative electrode collector) of electrode sheet (negative electrode sheet) on the negative electrode side protruding and stacked in a plurality of layers is formed at one side edge in the width direction X of the electrode body 20. Whereas, the positive electrode collector bundle 26 including an uncoated part (positive electrode collector) of the electrode sheet (positive electrode sheet) on the positive electrode side protruding and stacked in a plurality of layers is formed at the other side edge. Then, the negative electrode collector bundle 24 is joined with the collector terminal (negative electrode collector terminal) 30 on the negative electrode side, and the positive electrode collector bundle 26 is joined with the collector terminal (positive electrode collector terminal) 40 on the positive electrode side. Hereinafter, a description will be given to a specific structure of the electrode body 20 and the collector terminals 30 and 40 in the present embodiment.

(2) Electrode Body

As shown in FIG. 2, the electrode body 20 includes a positive electrode sheet 50, a negative electrode sheet 60, and a separator 70. The electrode body 20 for use in the present embodiment is a wound electrode body formed by winding a lamination body including the positive electrode sheet 50 and the negative electrode sheet 60 stacked via the separator 70. At the central part in the width direction X of the electrode body 20, a core part 22 including a positive electrode active material layer 54 and a negative electrode active material layer 64 described later wound and stacked one on another is formed. Hereinafter, respective members forming the electrode body 20 will be specifically described.

(a) Positive Electrode Sheet

The positive electrode sheet 50 includes a foil-shaped positive electrode collector 52, and a positive electrode active material layer 54 coated on the surface of the positive electrode collector 52. Then, at one side edge of the positive electrode sheet 50 in the width direction X, a positive electrode uncoated part 56 at which the positive electrode active material layer 54 is not coated and the positive electrode collector 52 is exposed is formed. In the present embodiment, the positive electrode uncoated part 56 is stacked and wound so as to protrude from the other electrode sheet (negative electrode sheet 60), resulting in the formation of a positive electrode collector bundle 26 including the wound and stacked positive electrode uncoated part 56 (exposed positive electrode collector 52).

For the positive electrode collector 52, the material for use in the positive electrode collector of this kind of battery can be used without particular restriction. Typically, the positive electrode collector 52 includes a metal having favorable conductivity, for example, a metal such as aluminum, nickel, titanium, or stainless steel, or an alloy including the metal, or the like. Out of these, aluminum or aluminum alloy is used in some embodiments.

The positive electrode active material layer 54 is a layer including a positive electrode active material. For the positive electrode active material, various compounds conventionally used for this kind of battery can be used. For this reason, a detailed description thereon is omitted. As examples of such a positive electrode active material, mention may be made of a composite oxide in a layered structure typified by $LiCoO_2$, $LiNiO_2$, $LiNi_xCo_yMn_{(1-x-y)}O_2$ (where $0<x<1$, $0<y<1$, and $0<x+y<1$), or the like. Alternatively, mention may be made of a composite oxide in a spinel structure as represented by $Li_2NiMn_3O_8$, $LiMn_2O_4$, or $Li_{1+x}Mn_{2-y}M_yO_4$ (where M is not present, or one or more metallic elements selected from Al, Mg, Co, Fe, Ni, and Zn, $0\leq x<1$, and $0\leq y<2$), a composite compound in an olivine structure such as $LiFePO_4$, and the like.

Further, the positive electrode active material layer 54 can be allowed to include a given component other than the positive electrode active material, if required. Examples of such a given component may include a conductive material and a binder. As the conductive material, carbon blacks such as acetylene black, and other carbon materials (such as graphite and carbon nanotube) can be used. As the binder, fluorine type binder such as polyvinylidene fluoride (PVDF), or polytetrafluoroethylene (PTFE), a rubber type binder such as styrene butadiene rubber (SBR), or the like can be used.

(b) Negative Electrode Sheet

The negative electrode sheet 60 includes a foil-shaped negative electrode collector 62, and a negative electrode active material layer 64 coated on the surface of the negative electrode collector 62. Then, at one side edge of the negative electrode sheet 60 in the width direction X, a negative electrode uncoated part 66 at which the negative electrode active material layer 64 is not coated and the negative electrode collector 62 is exposed is formed. In the present embodiment, the negative electrode uncoated part 66 is stacked and wound so as to protrude from the other electrode sheet (positive electrode sheet 50), resulting in the formation of a negative electrode collector bundle 24 including the wound and stacked negative electrode uncoated part 66 (exposed positive electrode collector 62).

For the negative electrode collector 62, the material for use in the negative electrode collector of this kind of battery can be used without particular restriction. For example, copper or an alloy mainly including copper is used. The copper type materials are low-priced materials having good conductivity, and have an advantage of being less likely to be molten by the electric potential during charging and discharging. However, undesirably, the negative electrode collector 62 including the copper type material is less likely to be elongated and tends to be broken when applied with an external pressure. Although described in detail later, in accordance with the present embodiment, it is possible to prevent the negative electrode collector 62 from being applied with a large pressure due to the interference of the negative electrode collector terminal 30 at the time of joining with the negative electrode collector terminal 30 (see FIG. 1). This can prevent the breakage of the negative electrode collector 62 even when a copper type material is used.

The negative electrode active material layer 64 is a layer including a negative electrode active material. For the negative electrode active material, various compounds conventionally used for this kind of battery can be used. For this reason, a detailed description thereon is omitted. As examples of such a negative electrode active material, mention may be made of carbon materials such as graphite, mesocarbon microbeads, and carbon blacks (such as acetylene black and ketjen black).

The negative electrode active material layer 64 can be allowed to include a given component other than the negative electrode active material.

For example, the negative electrode active material layer 64 can include a binder and the like as with the positive electrode active material layer 54. As the binders, fluorine type binders such as PVDF and PTFE, and rubber type binders such as SBR can be used.

(c) Separator

The separator 70 is an insulating sheet to be arranged so as to be interposed between the positive electrode sheet 50 and the negative electrode sheet 60. For the separator 70, an insulating sheet including a plurality of minute holes for transmitting a charge carrier (e.g., lithium ion) therethrough formed therein is used. As the materials for the separator 70, the same materials as those for use in a general lithium ion secondary battery can be used without particular restriction.

As one example of the material for such a separator 70, a porous polyolefin type resin can be mentioned.

(d) Dimensions of Electrode Body

With the lithium ion secondary battery 100 in accordance with the present embodiment, electrode sheets 50 and 60 narrower in widths of the uncoated parts 56 and 66, respectively, are used. When an electrode body 20 is manufactured using such electrode sheets 50 and 60, the width of the core part 22 increases, and each width w1 of the collector bundles 24 and 26 decreases. Specifically, with the lithium ion secondary battery 100 in accordance with the present embodiment, the range of the ratio (w1/L) of the width w1 of the collector bundles 24 and 26 to the width L of the electrode body 20 (see FIG. 1) is 0.07 to 0.09. With a general lithium ion secondary battery, the range of w1/L is 0.11 to 0.12. Thus, by using the electrode sheets 50 and 60 narrower in widths of the uncoated pails 56 and 66, and increasing the area of the core part 22 (the coating areas of the active material layers 54 and 64), it is possible to improve the battery performances such as battery capacity.

(3) Collector Terminal

As shown in FIG. 1, both of the positive electrode collector terminal 40 and the negative electrode collector terminal 30 are conductive members extending along the height direction Z.

In the present embodiment, the positive electrode collector terminal 40 and the positive electrode collector bundle 26 are joined with each other by ultrasonic welding. On the other hand, an upper end 42 of the positive electrode collector terminal 40 is exposed to the outside of the case 10, and is electrically connected with a connecting bolt 46 via an external connecting member 44. Such a positive electrode collector terminal 40 is formed of, for example, aluminum or an alloy including aluminum in some embodiments.

In the present embodiment, the negative electrode collector terminal 30 and the negative electrode collector bundle 24 are joined with each other by resistance welding. With the resistance welding, a stronger pressure is applied than with other welding methods. For this reason, the breakage of the negative electrode collector 62 becomes more likely to occur. Although described in detail later, in accordance with the present embodiment, it is possible to prevent the interference between the converging part 24b and the negative electrode collector terminal 30, and to prevent the converging part 24b from being applied with a strong pressure. This can prevent the breakage of the negative electrode collector 62 even when resistance welding is carried out. Further, as with the positive electrode collector terminal 40, an upper end 32 of the negative electrode collector terminal 30 is exposed to the outside of the case 10, and is electrically connected with a connecting bolt 36 via an external connecting member 34. Such a negative electrode collector terminal 30 is formed of, for example, copper or an alloy including copper in some embodiments.

(4) Joining of Collector Bundle and Collector Terminal

Then, a description will be given to the structure of the junction portion between the collector bundle and the collector terminal in the lithium ion secondary battery 100 in accordance with present embodiment. Hereinafter, a description will be given to the junction portion on the negative electrode side, namely, the junction portion between the negative electrode collector bundle 24 and the negative electrode collector terminal 30.

As shown in FIG. 3, the negative electrode collector terminal 30 is formed in a plate shape and has a flat junction surface 30a. The junction surface 30a of the negative electrode collector terminal 30 is brought into contact with the outer end in the width direction X of the negative electrode collector bundle 24. Thus, resistance welding is performed while pressing the negative electrode collector terminal 30 and the outer end of the negative electrode collector bundle 24 in a sandwiching manner. As a result, the negative electrode collector bundle 24 and the negative electrode collector terminal 30 are joined with each other. This results in the formation of the junction part 24a of a flat region including the negative electrode uncoated part 66 (negative electrode collector 62) in a plurality of layers, compressed together, at the outer end of the negative electrode collector bundle 24. In the present embodiment, the junction part 24a of the negative electrode collector bundle 24 and the junction surface 30a of the negative electrode collector terminal 30 are joined with each other in a surface contact manner.

As described above, at the negative electrode collector bundle 24 including the junction part 24a formed therein, the converging part 24b is formed inward in the width direction X. The converging part 24b is a region in which the negative electrode uncoated part 66 (negative electrode collector 62) in a plurality of layers converges so that the surface is inclined toward the junction part 24a. As described above, the angle formed between the inclined surfaces of the converging part 24b is herein referred to as a "foil collecting angle θ". The "foil collecting angle θ" is calculated by the following equation (1):

$$\theta = 2 \tan^{-1}(0.5t/a1) \quad (1)$$

where t (mm) represents the thickness at the inner end in the width direction X of the negative electrode collector bundle 24, and a1 (mm) represents the width of the converging part 24b.

As described above, in the present embodiment, the electrode sheet narrow in width of the uncoated part such that the w1/L becomes 0.07 to 0.09 is used. In such a case, the ratio (a1/w1) of the width a1 of the converging part 24b to the width w1 of the negative electrode collector bundle 24 decreases. Specifically, use of the negative electrode sheet 60 narrow in width of the negative electrode uncoated part 66 results in a narrower width w1 of the negative electrode collector bundle 24. However, in order to properly join the negative electrode collector terminal 30, it is necessary to ensure a given or larger width of the junction part 24a. For this reason, when the width of the negative electrode uncoated part 66 is reduced, the width a1 of the converging part 24b is reduced by that much, resulting in a decrease in the a1/w1. For example, for a general lithium ion secondary battery, the a1/w1 falls within the range of 0.34 to 0.48. On the other hand, for the lithium ion secondary battery 100 in accordance with the present embodiment, the a1/w1 becomes 0.15 or more and less than 0.34.

Then, thus, a decrease in width a1 of the converging part 24b results in an increase in foil collecting angle θ of the negative electrode collector bundle 24. For example, for a general lithium ion secondary battery, the foil collecting angle θ of the collector bundle based on the equation (1) becomes about 80°. On the other hand, for the lithium ion secondary battery 100 in accordance with the present embodiment, the foil collecting angle θ of the collector bundle falls within the range of 120°≤θ≤160°. When the foil collecting angle θ of the negative electrode collector bundle 24 thus becomes 120° or larger, the inclination of the surface of the converging part 24b increases. For this reason, when the negative electrode collector terminal 30 is joined to the negative electrode collector bundle 24, the inner end in the width direction X of the junction surface 30a of the negative electrode collector terminal 30 may interfere with the surface of the converging part 24b of the negative electrode collector bundle 24.

However, for the lithium ion secondary battery 100 in accordance with the present embodiment, at the end on the converging part 24b side of the junction surface 30a of the negative electrode collector terminal 30, an R part 30b having a curvature radius of 0.3 mm or more is formed. The experiments conducted by the present inventors revealed that, by forming the R part 30b having such a curvature radius, it is possible to properly prevent the interference between the negative electrode collector terminal 30 and the converging part 24b even when the foil collecting angle θ of the negative electrode collector bundle 24 becomes 120° or more. For this reason, in accordance with the lithium ion secondary battery 100 in accordance with the present embodiment, it is possible to prevent the breakage of the negative electrode collector 62 due to the interference between the negative electrode collector terminal 30 and the converging part 24b even when the electrode sheet narrow in width of the uncoated part is used.

The curvature radius of the R part 30b has no particular restriction so long as it is 0.3 mm or more, and it may be 0.4 mm or more, and may be 0.5 mm or more. However, in view of the strength and the ease of processing of the negative electrode collector terminal 30, the curvature radius of the R part 30b is set equal to or smaller than the thickness t2 of the collector terminal 30 in some embodiments. The curvature radius of the R part can be determined by various methods, and can be determined by for example, observation of the cross sectional shape of the collector terminal or a laser measuring instrument.

Further, the method for forming the R part 30b at the negative electrode collector terminal 30 has no particular restriction and various methods usable for R processing of this kind of metallic member can be adopted. For example, the shape of the die for forming the negative electrode collector terminal may be changed, thereby manufacturing the negative electrode collector terminal 30 having the R part 30b. Alternatively, as other methods for forming the R part 30b, cutting processing, and the like may be mentioned. However, from the viewpoints of the manufacturing efficiency, changing of the shape of the forming die may prevent the generation of burs, and the like.

2. Other Embodiments

Up to this point, the lithium ion secondary battery in accordance with one embodiment of the present disclosure was described. The embodiment is not intended to restrict the present disclosure, and various configuration can be changed.

For example, in the embodiment, the R part 30b having a curvature radius of 0.3 mm or more is formed at the end of the junction surface 30a of the negative electrode collector terminal 30. However, such an R part may be formed at the positive electrode collector terminal. This can prevent the occurrence of breakage of the positive electrode collector due to the interference between the converging part and the positive electrode collector terminal upon joining the positive electrode collector terminal and the positive electrode collector bundle. As described above, for a general lithium ion secondary battery, on the negative electrode side, the number of the factors causing the breakage of the collector (use of a copper type material, resistance welding, and the like) tend to be larger. For this reason, when the R part is formed at any one of the negative electrode collector terminal and the positive electrode collector terminal, the R part may be formed at the negative electrode collector terminal as in the embodiment.

Further, the structure of the electrode body for use in the battery disclosed herein is not limited to the wound type electrode body 20 used in the embodiment. Other examples of the electrode body may include a lamination electrode body in which positive electrode sheets and negative electrode sheets are stacked in a plurality of layers via separators. Also with such a lamination electrode body, a collector bundle including an uncoated part stacked in a plurality of layers is formed at each opposite side edge of the electrode body. Then, also at the collector bundle of the lamination electrode body, the junction part and the converging part are formed. For this reason, use of an electrode sheet narrow in width of the uncoated part results in an increase in foil collecting angle θ of the collector bundle. This facilitates the interference between the collector terminal and the converging part. For this reason, even when a lamination electrode body is used, the technology disclosed herein can be applied.

Test Example

Hereinafter, the test related to the present disclosure will be described. The following description is not intended to restrict the present disclosure.

1. Preparation of Sample

In the present test example, an electrode sheet in which a positive electrode active material layer obtained by mixing a positive electrode active material ($LiNi_{1/3}Co_{1/3}Mn_{1/3}O_2$), a conductive material (acetylene black), and a binder (polyvinylidene fluoride) at a mass ratio of 94:3:3 was prepared at each opposite surface of a positive electrode collector made of aluminum was manufactured as a positive electrode sheet. On the other hand, an electrode sheet in which a negative electrode active material layer obtained by mixing a negative electrode active material (carbon black), a thickener (carboxymethyl cellulose), and a binder (styrene butadiene rubber) at a mass ratio of 98:1:1 was formed at each opposite surface of a negative electrode collector made of copper was manufactured as a negative electrode sheet. Then, a lamination body in which the positive electrode sheet and the negative electrode sheet were stacked via a separator made of polyethylene was formed. The resulting lamination body was wound, thereby manufacturing a wound electrode body. In the present test example, the width of the uncoated part of each electrode sheet was narrowed, thereby manufacturing an electrode body with a ratio (w1/L) of the width w1 of the collector bundle to the width L of the wound electrode body of 0.08.

Then, in the present test example, the positive electrode collector bundle of the wound electrode body was joined with the positive electrode collector terminal made of aluminum by ultrasonic welding. In addition, the negative electrode collector bundle was joined with the negative electrode collector terminal made of copper by resistance welding. In the present test example, an R part was formed at one end of the junction surface of the negative electrode collector terminal, and was joined with the collector bundle so that the R part was arranged on the converging part side. At this step, samples 1 to 6 were allowed to have respectively different curvature radii of the R parts. The curvature radii of the R parts of respective samples are shown in Table 1.

2. Evaluation Test

After performing joining of the negative electrode collector terminal, the collector bundle of each sample was visually observed. Then, the sample which underwent breakage of the collector forming the collector bundle was rated as "unacceptable", and the sample for which breakage was not observed was rated as "acceptable". In the present test example, for each of the samples 1 to 6, evaluations in the cases where the foil collecting angle θ based on the equation (1) were 3 kinds of 120°, 130°, and 160° were performed. The evaluation results are shown in Table 1.

TABLE 1

|  | Sample 1 | Sample 2 | Sample 3 | Sample 4 | Sample 5 | Sample 6 |
|---|---|---|---|---|---|---|
| Curvature radius (mm) | 0.1 | 0.2 | 0.3 | 0.4 | 0.5 | 0.6 |
| Breakage rating (120°) | Unacceptable | Unacceptable | Acceptable | Acceptable | Acceptable | Acceptable |
| Breakage rating (130°) | Unacceptable | Unacceptable | Acceptable | Acceptable | Acceptable | Acceptable |
| Breakage rating (160°) | Unacceptable | Unacceptable | Acceptable | Acceptable | Acceptable | Acceptable |

As shown in Table 1, for samples 1 and 2, in any of the cases where the foil collecting angle θ was within the range of 120° to 160°, the breakage of the collector was observed. The breakage of the collector was observed at the converging part adjacent to the negative electrode collector terminal. From this, it is presumed that the interference between the negative electrode collector terminal and the converging part broke the collector. On the other hand, for the samples 3 to 6, in any of the cases where the foil collecting angle θ was within the range of 120° to 160°, the breakage of the collector was not observed. It is understood that this is because the formation of the R part with a curvature radius of 0.3 mm or more at the end of the junction surface of the negative electrode collector terminal could prevent the interference between the end of the collector terminal and the converging part. This proved the following: even when the width of the uncoated part was narrowed, so that the foil collecting angle fell within the range of 120° or more and 160° or less, the formation of the R part with a curvature radius of 0.3 mm or more at the end of the junction surface of the collector terminal can prevent the breakage of the collector due to the interference between the collector terminal and the converging part.

Up to this point, specific examples of the present disclosure were described in detail. However, these are merely examples, and do not restrict the appended claims. The technology described in the appended claims include various modifications and changes of the specific examples shown up to this point.

What is claimed is:

1. A battery comprising:
an electrode body, the electrode body including a plurality of layers in a stacked manner,
the plurality of layers including a positive electrode sheet and a negative electrode sheet, and the positive electrode sheet and the negative electrode sheet each including a foil-shaped collector and an active material layer coated on a surface of a collector; and
a collector terminal to be joined to the collector of the positive electrode sheet or the negative electrode sheet, wherein
each electrode sheet of the positive electrode sheet and the negative electrode sheet includes an uncoated part formed at one side edge in the width direction of the electrode sheet, wherein the uncoated part is a part in which the active material layer is not coated and the collector is exposed;
a collector bundle provided on the both edges in the width direction of the electrode body, wherein, in the collector bundle, a plurality of uncoated parts in a plurality of electrode sheets, each thereof being one electrode sheet, are stacked in layer so as to protrude from the other electrode sheet;
a junction part provided at an outer end in the width direction of the collector bundle, wherein, in the junction part, the plurality of uncoated parts in the plurality of electrode sheets, each thereof being the one electrode sheet, are compressed together;
a converging part provided on an inner side in the width direction of the collector bundle, wherein the converging part is a part in which the plurality of uncoated parts in the plurality of electrode sheets, each thereof being the one electrode sheet, are converging in layer so that the surface is inclined toward the junction part;
the collector terminal has a flat junction surface to be joined with the junction part of the collector bundle,
the battery has a foil collecting angle θ of the collector bundle calculated by following equation (1) satisfies a relationship of expression (2), and
the battery has an R part with a curvature radius of 0.3 mm or more at an end on a converging part side of a junction surface of the collector terminal, $$\theta = 2\tan^{-1}(0.5t/a1) \quad (1)$$

$$120° \leq \theta \leq 160° \quad (2)$$

where, in the equation (1), t represents a thickness (mm) at an inner end in the width direction of the collector bundle, and a1 represent the width (mm) of the converging part.

2. The battery according to claim 1, wherein the curvature radius of the R part is equal to or smaller than the thickness of the collector terminal.

3. The battery according to claim 1, wherein the collector includes at least one of copper and an alloy mainly including copper.

4. The battery according to claim 3, wherein the collector terminal includes at least one of copper and an alloy mainly including copper.

* * * * *